(12) United States Patent
Inagaki et al.

(10) Patent No.: US 10,230,098 B2
(45) Date of Patent: Mar. 12, 2019

(54) ACTIVE MATERIAL FOR BATTERY, MANUFACTURING METHOD OF THE SAME, NON-AQUEOUS ELECTROLYTIC BATTERY AND BATTERY PACK

(71) Applicant: KABUSHIKI KAISHA TOSHIBA, Tokyo (JP)

(72) Inventors: Hiroki Inagaki, Kawasaki (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 498 days.

(21) Appl. No.: 14/578,941

(22) Filed: Dec. 22, 2014

(65) Prior Publication Data

US 2015/0108399 A1 Apr. 23, 2015

Related U.S. Application Data

(63) Continuation of application No. 12/048,679, filed on Mar. 14, 2008, now abandoned.

(30) Foreign Application Priority Data

Aug. 10, 2007 (JP) ................. 2007-210281

(51) Int. Cl.
*H01M 10/05* (2010.01)
*H01M 10/052* (2010.01)
(Continued)

(52) U.S. Cl.
CPC .......... *H01M 4/364* (2013.01); *C01G 23/005* (2013.01); *C01G 23/047* (2013.01); *H01M 4/485* (2013.01);
(Continued)

(58) Field of Classification Search
None
See application file for complete search history.

(56) References Cited

U.S. PATENT DOCUMENTS 5,545,468 A * 8/1996 Koshiba ............... H01M 4/485
429/231.1
6,818,347 B1 11/2004 Jin et al.
(Continued)

FOREIGN PATENT DOCUMENTS

CN 1095191 A 11/1994
CN 1862870 A 11/2006
(Continued)

OTHER PUBLICATIONS

Takami et al., JP 2005-332684 Machine Translation; 36 pages total.*

(Continued)

*Primary Examiner* — Ula C Ruddock
*Assistant Examiner* — Anna Korovina
(74) *Attorney, Agent, or Firm* — Oblon, McClelland, Maier & Neustadt, L.L.P.

(57) ABSTRACT

An active material for a battery includes a mixed phase includes a lithium titanium composite oxide phase and a nonstoichiometric titanium oxide phase. This active material is excellent in lithium absorption/desorption performance, exhibiting high electric potentials in lithium absorption/desorption and high conductivity.

15 Claims, 5 Drawing Sheets

(51) Int. Cl.
  H01M 4/485 (2010.01)
  C01G 23/047 (2006.01)
  H01M 4/36 (2006.01)
  C01G 23/00 (2006.01)
  H01M 10/0569 (2010.01)
  H01M 4/02 (2006.01)

(52) U.S. Cl.
  CPC ......... H01M 10/05 (2013.01); H01M 10/052 (2013.01); C01P 2002/32 (2013.01); C01P 2002/72 (2013.01); C01P 2006/40 (2013.01); H01M 10/0569 (2013.01); H01M 2004/021 (2013.01); H01M 2220/20 (2013.01); H01M 2220/30 (2013.01); Y02T 10/7011 (2013.01)

(56) References Cited

U.S. PATENT DOCUMENTS

| | | |
|---|---|---|
| 2003/0035999 A1 | 2/2003 | Gao et al. |
| 2004/0197657 A1 | 10/2004 | Spitler et al. |
| 2005/0014066 A1 | 1/2005 | Shimamune |
| 2005/0221188 A1 | 10/2005 | Takami et al. |
| 2005/0281727 A1 | 12/2005 | Yoshizawa et al. |
| 2006/0257746 A1* | 11/2006 | Inagaki .................. C01G 23/00 429/231.5 |
| 2009/0042095 A1 | 2/2009 | Inagaki et al. |

FOREIGN PATENT DOCUMENTS

| | | |
|---|---|---|
| CN | 101000960 A | 7/2007 |
| JP | 9-199179 | 7/1997 |
| JP | 2001-213662 | 8/2001 |
| JP | 2002-100354 | 4/2002 |
| JP | 2005-332684 | 4/2002 |
| JP | 2005-332684 | 12/2005 |
| JP | 2005332684 A * | 12/2005 |
| JP | 2006-318797 | 11/2006 |
| JP | 2007-214120 A | 8/2007 |
| JP | 2009-43679 A | 2/2009 |

OTHER PUBLICATIONS

Office Action dated Oct. 9, 2009, in Chinese Patent Application No. 200810145633.6 (with English language translation).

Office Action dated Apr. 28, 2010, in Chinese Patent Application No. 201004230047513.0 (with English language translation).

Written Submission of Publications dated Dec. 24, 2013 in Japanese Patent Application No. 2007-210281 (with English language translation).

* cited by examiner

ACTIVE MATERIAL FOR BATTERY, MANUFACTURING METHOD OF THE SAME, NON-AQUEOUS ELECTROLYTIC BATTERY AND BATTERY PACK

CROSS-REFERENCE TO RELATED APPLICATIONS

This application is a continuation application of U.S. application Ser. No. 12/048,679, filed Mar. 14, 2008, now pending; based upon and claims the benefit of priority from prior Japanese Patent Application No. 2007-210281, filed Aug. 10, 2007, the entire contents of which are incorporated herein by reference.

BACKGROUND OF THE INVENTION

1. Field of the Invention

This invention relates to an active material for battery, a method of manufacturing the active material for battery, a non-aqueous electrolyte battery and a battery pack.

2. Description of the Related Art

Since the non-aqueous electrolyte battery is designed such that the charging/discharging thereof is effected through the movement of lithium ions between a negative electrode and a positive electrode, it is expected to be useful as a battery exhibiting high energy density, so that the research and development of the non-aqueous electrolyte battery are now intensively conducted.

The non-aqueous electrolyte battery is demanded to have various properties depending on the end-use thereof. For example, if it is desired to be used as a power source for a digital camera, the battery is required to exhibit the discharging of about 3 C. Whereas, if it is desired to be used as a power source for vehicles such as a hybrid electric motor car, the battery is expected to require the discharging of about 10 C or more. For this reason, the non-aqueous electrolyte battery to be used for these end-uses is desired to exhibit especially large current characteristics.

In the non-aqueous electrolyte battery available in the market, lithium-transition metal composite oxides are employed as an active material of the positive electrode and carbonaceous materials are employed as an active material of the negative electrode. As for the transition metals included in the lithium-transition metal composite oxides, metals such as Co, Mn, Ni, etc., are generally employed.

Recently, it is studied to employ, as an active material of the negative electrode, lithium titanium composite oxides which are higher in electric potential in the absorption/desorption of lithium as compared with carbonaceous materials. The lithium titanium composite oxides are known to exhibit very small changes in volume as they are subjected to charging/discharging. For this reason, a non-aqueous electrolyte battery where the lithium titanium composite oxides are employed as an active material of the negative electrode is enabled to exhibit excellent cycle characteristics.

Among the lithium titanium composite oxides, spinel type lithium titanate (composition formula: $Li_{4+w}Ti_5O_{12}$ ($0 \leq w \leq 3$)) is especially excellent in cycle characteristics, so that this compound is considered promising as a long-life active material for battery. The spinel type lithium titanate however is relatively low in electronic conductivity and in lithium ion conductivity, so that the large current characteristics of battery using this spinel type lithium titanate are relatively low as compared with the battery using a carbonaceous material as an active material of the negative electrode.

Under the circumstances described above, JP-A 9-199179 (KOKAI) discloses a method of improving the large current characteristics of battery, wherein a carbonaceous material such as carbon black is added as a conductive material to the lithium titanium composite oxides to be employed as an active material of the negative electrode, thereby enhancing the electronic conductivity of lithium titanium composite oxides. JP-A 2002-100354 (KOKAI) also discloses a method of improving the large current characteristics of battery, which is effected through the pulverization of the lithium titanium composite oxides to shorten the diffusion path of lithium ions.

JP-A 2005-332684 (KOKAI) filed previously by the present applicant also discloses a method of improving the high-temperature cycle characteristics of a battery, which is effected through the addition of nonstoichiometric titanium oxide exhibiting conductivity to lithium titanium composite oxide to be employed as an active material of the negative electrode.

The aforementioned three patent documents however are accompanied with the following problems.

The carbonaceous material to be employed as a conductive agent is incapable of forming a film which is stable at a working electric potential of lithium titanium composite oxide, i.e., 1-2V (vs. $Li/Li^+$). As a result, when a large quantity of carbonaceous material is added to lithium titanium composite oxides as proposed by JP-A 9-199179 (KOKAI), the carbonaceous material is permitted to excessively react with an electrolyte to generate gas and, when the electrolyte is exhausted, the battery is caused to deform, resulting in the deterioration in performance of battery.

When the pulverized lithium titanium composite oxides are to be employed as suggested in JP-A 2002-100354 (KOKAI), it is required to incorporate a large quantity of carbonaceous material in order to form a conductive path linking these pulverized particles, resulting in the generation of a large quantity of gas. Further, on the occasion of manufacturing a negative electrode by a process wherein a slurry containing fine particles of lithium titanium composite oxide is coated on the surface of a current collector and dried to form a negative electrode layer containing an active material, it is required to incorporate a large quantity of binder into the slurry so as to immobilize the fine particles of lithium titanium composite oxide in the negative electrode layer. As a result, the viscosity of slurry becomes higher, making it difficult to coat the slurry on the current collector and, at the same time, the binder itself becomes an obstacle for the diffusion of electrons and ions, thereby deteriorating the large current characteristics.

On the other hand, the employment of nonstoichiometric titanium oxide exhibiting conductivity as proposed by JP-A 2005-332684 (KOKAI) is effective in overcoming the problem to be caused by the addition of a carbonaceous material as a conductive agent as described in JP-A 9-199179 (KOKAI). However, although the non-aqueous electrolyte battery equipped with a negative electrode containing lithium titanium composite oxide and nonstoichiometric titanium oxide is effective in improving high-temperature cycle characteristics, it does not necessarily indicate excellent large current characteristics. There are two reasons for this problem. One reason is that since the lithium titanium composite oxide and the nonstoichiometric titanium oxide are both granular, they are contacted with each other simply through point contact. The other reason is that it is difficult to make the nonstoichiometric titanium oxide into fine powder as compared with the carbonaceous material.

BRIEF SUMMARY OF THE INVENTION

According to a first aspect of the present invention, there is provided an active material for use in a battery, comprising a mixed phase comprising a lithium titanium composite oxide phase and a nonstoichiometric titanium oxide phase.

According to a second aspect of the present invention, there is provided a method of manufacturing an active material for use in a battery, comprising:

sintering a mixture comprising raw lithium material and raw titanium material to produce a powder of mixed phase comprising a lithium titanium composite oxide phase and a titanium dioxide phase; and sintering the powder of mixed phase in a reducing gas atmosphere at a temperature ranging from 600 to 1000° C.

According to a third aspect of the present invention, there is provided a method of manufacturing an active material for use in a battery, comprising:

sintering a mixture comprising raw lithium material and raw titanium material to produce a powder of mixed phase comprising a lithium titanium composite oxide phase and a titanium dioxide phase; and sintering the powder of mixed phase in the presence of carbon powder in an inert gas atmosphere at a temperature ranging from 600 to 1000° C.

According to a fourth aspect of the present invention, there is provided a non-aqueous electrolyte battery, comprising:

an outer case;

a positive electrode housed in the outer case;

a negative electrode housed in the outer case in a manner that it is spaced away from the positive electrode, the negative electrode containing an active material including a mixed phase comprising a lithium titanium composite oxide phase and a nonstoichiometric titanium oxide phase; and a non-aqueous electrolyte accommodated in the outer case.

According to a fifth aspect of the present invention, there is provided a battery pack, comprising a plurality of the aforementioned non-aqueous electrolyte batteries, which are respectively electrically connected with each other in series, in parallel, or in series and parallel.

DETAILED DESCRIPTION OF THE INVENTION

Next, the active material for battery, a method of manufacturing the active material for battery, a non-aqueous electrolyte battery and a battery pack according to various aspects of the present invention will be explained in detail.

The active material for battery according to one embodiment comprises a mixed phase comprising a lithium titanium composite oxide phase and a nonstoichiometric titanium oxide phase.

Herein, by the term "mixed phase", it is intended to indicate that different phases are co-existed without being spaced away from each other. Namely, it means that the lithium titanium composite oxide phase and the nonstoichiometric titanium oxide phase are co-existed in a single particle (powder). Therefore, the "mixed phase" can be distinguished from a state where the powder of one component is simply mixed with the powder of another component. A distinction between these states can be made clear by the following method where the negative electrode is taken as one example.

Figure 3:
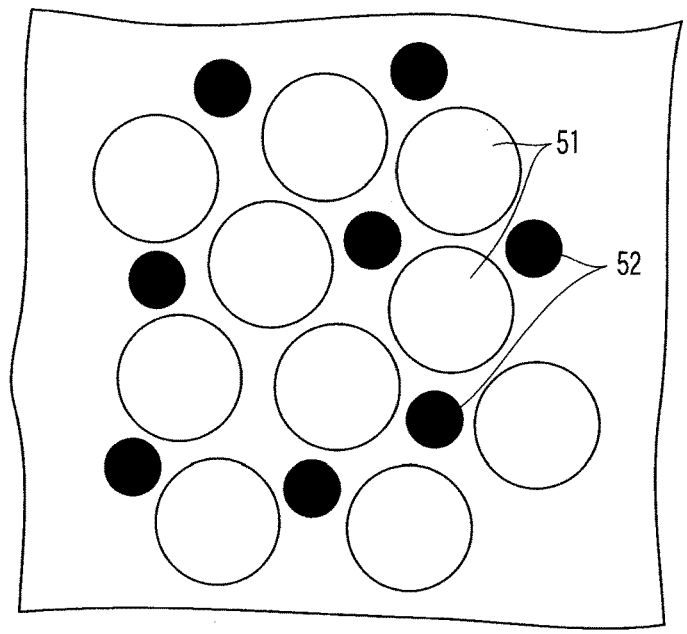
FIG. 3 is a diagram illustrating a mixed state of two kinds of powder.
Figure 4:
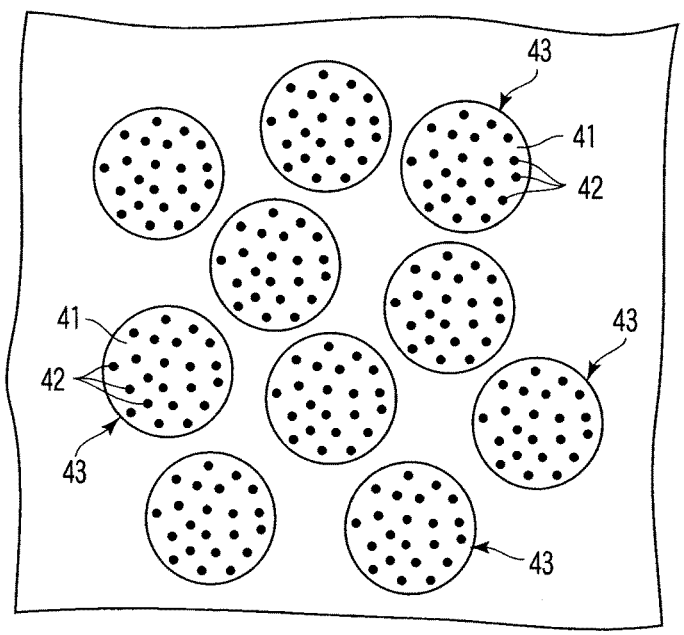
FIG. 4 is a diagram illustrating powder which consists of a mixed phase comprising two kinds of phase.

First of all, a current collector and a negative electrode layer are separately removed from the negative electrode. Then, a binder component and a conductive component such as a carbonaceous material are removed from the negative electrode layer, and the residue is subjected to ultrasonic cleaning to obtain a specimen. If the specimen is in a state where different kinds of powders (lithium titanium composite oxide powder and the nonstoichiometric titanium oxide powder) are simply mixed together, these different kinds of powders are permitted to individually exist. Therefore, when these different kinds of powders are observed by means of an electronic microscope, it will be confirmed that the powder 51 formed only of lithium titanium composite oxide and the powder 52 formed only of nonstoichiometric titanium oxide are permitted to exist individually as shown in FIG. 3. More specifically, the lithium titanium composite oxide can be visually recognized as white powder and the nonstoichiometric titanium oxide can be visually recognized as black powder. Whereas, the mixed phase such as the active material according to one embodiment is observed by means of an electronic microscope, it will be recognized that the lithium titanium composite oxide phase 41 and the nonstoichiometric titanium oxide phase 42 are co-existed in a single particle (powder) 43 as shown in FIG. 4, wherein these phases 41 and 42 are not spaced away but brought into a co-existed state of two phases.

The lithium titanium composite oxide phase of a spinel type structure or a ramsdellite type structure is preferable in enhancing the charge/discharge cycle life of battery. Especially, it is more preferable to employ the lithium titanium composite oxide phase that can be represented by a chemical formula of: $Li_{4+w}Ti_5O_{12}$ ($0 \leq w \leq 3$) or $Li_{2+y}Ti_3O_7$ ($0 \leq y \leq 3$). Meanwhile, although the molar ratio of oxygen is formally represented by 12 in the spinel type $Li_4Ti_5O_{12}$ and by 7 in the ramsdellite type $Li_2Ti_3O_7$, these values may fluctuate depending on the influence of oxygen nonstoichiometry, etc.

The nonstoichiometric titanium oxide phase preferably has a Magneli structure which can be represented by a general formula of: $Ti_nO_{2n-1}$ ($4 \leq n \leq 10$), having a rhombic structure which can be represented by a general formula of: $TiO_n$ ($1.85 < n < 2$), having a monoclinic structure which can be represented by a general formula of: $Ti_3O_5$, or having a hexagonal structure which can be represented by TiO. The reason is that these structures of nonstoichiometric titanium oxide phase do not interact with lithium, so that they do not give any adverse influences to the charge/discharge cycle performance of battery.

The lithium titanium composite oxide phase and the nonstoichiometric titanium oxide phase preferably contain at least one element selected from the group consisting of Nb, Ta, P, Na and K, respectively. Especially, the lithium titanium composite oxide phase containing Nb, Ta or P is effective in enhancing the electric conductivity thereof. The lithium titanium composite oxide phase containing Na or K is effective in enhancing the apparent ionic conductivity due to the fact that the crystallite thereof can be decreased in diameter. The content of these elements (an amount thereof based on a total amount of the lithium titanium composite oxide phase and these elements) should preferably be confined to not less than 0.01% by weight and more than 3% by weight. If the content of these elements is less than 0.01% by weight, it would become difficult to sufficiently attain the effects to be derived from the inclusion of these elements. On the other hand, if the content of these elements exceeds 3% by weight, the magnitude of absorption of lithium employed as an active material may be decreased, resulting in the decrease of electric capacity of battery.

A preferable mixing ratio between the lithium titanium composite oxide phase and the nonstoichiometric titanium oxide phase in the mixed phase can be defined from the main peak intensity ratio of these phases that can be obtained through the measurement by means of powder X-ray diffractometry. Specifically, when the main peak intensity of the lithium titanium composite oxide phase measured by means of powder X-ray diffractometry using CuKα as a radiation source is assumed as 100, the ratio of the nonstoichiometric titanium oxide phase existing in the mixed phase as an active material would be increased as the main peak intensity of the nonstoichiometric titanium oxide phase that can be measured by means of powder X-ray diffractometry becomes higher, thus making it possible to enhance the electronic conductivity of the active material. However, because of the fact that as the main peak intensity of the nonstoichiometric titanium oxide phase becomes higher, the ratio of the nonstoichiometric titanium oxide phase that does not contribute to the absorption/desorption of lithium ions is caused to increase, the capacity (energy density) of active material would be decreased. Therefore, the main peak intensity of the nonstoichiometric titanium oxide phase should preferably be regulated such that, when the main peak intensity of the lithium titanium composite oxide phase is assumed as 100, it is confined to the range of not less than 1 and not more than 20, more preferably not less than 5 and not more than 10. As for the location of the main peak of these phases, it is approximately 4.83 Å (2θ:18°) in the case of the spinel type lithium titanium composite oxide $Li_4Ti_5O_{12}$ phase; approximately 4.44 Å (2 θ:20°) in the case of the ramsdellite type lithium titanium composite oxide $Li_2Ti_3O_7$ phase; and approximately 2.50 Å (2θ:36°) in the case of the nonstoichiometric titanium oxide phase having a hexagonal structure represented by TiO. By the way, when the location of main peak of any one of these phases is superimposed with the location of main peak of other phase, the main peak intensity of each of these phases can be calculated from a clear peak located on lower angle side by making use of the peak intensity ratio shown on the JCPDS Card.

Preferably, the mixed phase should be constructed such that it is consisted of powder and that an average particle diameter of the primary particle thereof is confined to not less than 0.1 μm and not more than 1 μm. By doing so, the handling of the mixed phase would become easier in the industrial production and, at the same time, the inter-solid diffusion of lithium ions can proceed smoothly.

Preferably, the specific surface area of the mixed phase powder should be confined to not less than 5 $m^2/g$ and not more than 50 $m^2/g$. By doing so, it becomes possible to sufficiently secure the absorption/desorption site of lithium ions and, at the same time, the handling thereof would become easier in the industrial production.

Next, the method of manufacturing the active material for battery according to one embodiment will be explained in detail.

(1) First of all, the sintering (primary sintering) of raw lithium material and raw titanium material are performed to produce a mixed phase powder comprising a lithium titanium composite oxide phase and a titanium dioxide phase.

More specifically, lithium salt such as lithium hydroxide, lithium oxide and lithium carbonate is prepared as a raw lithium material and a predetermined quantity thereof is dissolved in pure water. Then, to the resultant aqueous solution is added a raw titanium material such as titanium oxide so as to obtain a mixture containing lithium and titanium at a predetermined atomic ratio. For example, if it is desired to synthesize a spinel type lithium titanium composite oxide having a composition formula of $Li_4Ti_5O_{12}$ ($Li_{4/5}TiO_{12/5}$), these raw materials are mixed together so as to obtain a mixture containing Li and Ti at an atomic ratio of 4/5:(1+α). Namely, the ratio of Ti is made larger than that of stoichiometric composition. For example, the α is set to α=0.01-0.2. By doing so, it becomes possible to synthesize the mixed phase powder which comprises the titanium dioxide phase that can be turned into a powdery precursor of the nonstoichiometric titanium oxide phase in the next sintering step and by the spinel type lithium titanium composite oxide phase. The solution thus obtained is allowed to dry with stirring to obtain the powdery precursor. As for the drying method on this occasion, it is possible to employ, for example, spray drying, granulation drying, freeze drying or a combination of any of these drying methods. Thereafter, the powdery precursor thus obtained is subjected to primary sintering in air atmosphere for example to obtain the mixed phase powder comprising a lithium titanium composite oxide phase and a titanium dioxide phase.

The atmosphere to be employed in this primary sintering may be selected from an oxygen atmosphere and an argon atmosphere other than air atmosphere. This primary sintering can be performed at a temperature of not less than 680° C. and not more than 1000° C. for a time period ranging, for example, not less than one hour and not less than 24 hours or so. If the sintering temperature is less than 680° C., the crystallinity of the lithium titanium composite oxide phase may be deteriorated or impurity phases such as $Li_2TiO_3$ may be caused to increase, thus possibly inviting the decrease of the electric capacity relative to the theoretical capacity of the mixed phase (active material) to be obtained. On the other hand, if the sintering temperature exceeds 1000° C., the sintering of the lithium titanium composite oxide phase in the mixed phase powder thus obtained may be permitted to excessively proceed, thereby permitting the crystallite to excessively grow in size, thus possibly resulting in the deterioration of the large current characteristics of battery. More preferably, the primary sintering should be performed at a temperature of not less than 720° C. and not more than 800° C. for a time period of not less than 5 hours and not more than 10 hours.

Then, the mixed phase powder thus obtained is subjected to sintering (secondary sintering) in a reducing gas atmosphere at a temperature of not less than 600° C. and not more than 1000° C., thereby allowing the reduction of the titanium dioxide phase to proceed in the mixed phase powder, thus converting, through phase change, the titanium dioxide phase into the nonstoichiometric titanium oxide phase and obtaining the mixed phase powder comprising the lithium titanium composite oxide phase and the nonstoichiometric titanium oxide phase. Thereafter, the mixed phase powder is subjected to prescribed treatments such as pulverization and classification, thus manufacturing an active material for the battery.

Examples of the reducing gas to be employed in this secondary sintering are hydrogen gas or ammonia. The temperature applied in this secondary sintering is preferably not less than 700° C. and not more than 900° C. The time period for this secondary sintering may be around one hour, though it differs depends on the configuration of particle, the diameter of particle, the sintering temperature, etc. For the purpose of allowing the reduction of the titanium dioxide to sufficiently take place, this secondary sintering should preferably be performed for a time period of not less than 20 hours and not more than 30 hours or so.

(2) By following the same process as described above (1), a mixed phase powder comprising the lithium titanium composite oxide phase and the titanium dioxide phase is manufactured. Subsequently, the mixed phase powder thus obtained is subjected to sintering (secondary sintering) in an inert gas atmosphere and in the presence of carbon powder at a temperature of not less than 600° C. and not more than 1000° C., thereby enabling the carbon powder to act as a reducing agent, thus allowing the reduction of the titanium dioxide phase to proceed in the mixed phase powder and converting, through phase change, the titanium dioxide phase into the nonstoichiometric titanium oxide phase, thereby obtaining the mixed phase powder comprising the lithium titanium composite oxide phase and the nonstoichiometric titanium oxide phase. Thereafter, the mixed phase powder is subjected to prescribed treatments such as pulverization and classification, thus manufacturing an active material for the battery.

Examples of the inert gas to be employed in this secondary sintering are nitrogen gas or argon gas. The temperature applied in this secondary sintering is preferably not less than 700° C. and not more than 900° C. The time period for this secondary sintering may be around one hour, though it differs depending on the configuration of particle, the diameter of particle, the sintering temperature, etc. For the purpose of allowing the reduction of the titanium dioxide to sufficiently take place, this secondary sintering should preferably be performed for a time period of not less than 20 hours and not more than 30 hours or so.

The active material for a battery according to one embodiment as explained above comprises a mixed phase which comprises a lithium titanium composite oxide phase which is excellent in the absorption/desorption performance of lithium acting as a major active substance and also higher in electric potential in the absorption/desorption of lithium, and by a nonstoichiometric titanium oxide phase functioning as a conductive agent. Because of this, when the active material is employed as an active material of the negative electrode for example, it is possible to realize a non-aqueous electrolyte battery which is free from the generation of gas as described hereinafter and excellent in large current characteristics.

The active material for the battery according to one embodiment can be used not only in the negative electrode but also in the positive electrode of the battery. Irrespective of the application thereof to the negative electrode or positive electrode, it is possible to obtain large current characteristics and gas-suppressing effects. Namely, the large current characteristics can be derived from the effects of the mixed phase comprising the lithium titanium composite oxide phase and the nonstoichiometric titanium oxide phase, so that the effects would not be decreased in any extent irrespective of the kinds of electrode, i.e., the negative electrode or the positive electrode, to which the active material is applied. Further, the gas-suppressing effects are derived owing to the working electric potential (1-2V vs. $Li/Li^+$) of lithium in the lithium titanium composite oxide phase, so that the gas-suppressing effects would not be decreased in any extent, likewise. Accordingly, the active material for battery according to the embodiment can be used not only in the negative electrode but also in the positive electrode of the battery while securing almost the same effects in either cases.

If the active material for battery according to the embodiment is to be used in the positive electrode, the active material of the negative electrode to be used as a counter-electrode may be selected from metal lithium, lithium alloys, and carbonaceous materials such as graphite, coke, etc.

Further, a result of novel method developed based on the new idea of the present inventors, it has been found out that it is possible to easily manufacture an active material which is useful in a battery and formed of a mixed phase comprising the lithium titanium composite oxide phase exhibiting excellent performance as explained above and the nonstoichiometric titanium oxide phase.

In the synthesis of lithium titanium composite oxides to be used as an active material of the negative electrode for example, titanium dioxide to be produced as a by-product acts to obstruct the absorption/desorption performance of lithium. Therefore, it is now practiced to control the process conditions so as to inhibit as much as possible the by-product of titanium dioxide, thereby making it possible to synthesize high-purity lithium titanium composite oxides.

Whereas, according to the present invention, in the step of the primary sintering of a mixture containing raw lithium material and raw titanium material, mainly the mixing ratio of raw materials is intentionally formulated so as to increase the quantity of by-product of titanium dioxide to thereby producing a mixed phase powder comprising a lithium titanium composite oxide phase and a titanium dioxide phase. Subsequently, this mixed phase powder is subjected to secondary sintering at a predetermined temperature in a reducing gas atmosphere or in an inert gas atmosphere accompanying the presence of carbon powder, thereby reducing the titanium dioxide phase in this mixed phase powder. As a result, the titanium dioxide phase is converted, through phase change, into a nonstoichiometric titanium oxide phase. In this manner, the present inventors have succeeded to manufacture an active material, which is useful in a battery, comprising a mixed phase comprising a lithium titanium composite oxide phase mainly acting as an active material and a nonstoichiometric titanium oxide phase acting as a conductive agent.

Next, the non-aqueous electrolyte battery according to one embodiment will be explained in detail as follows.

This non-aqueous electrolyte battery is equipped with an outer case. A positive electrode is housed inside the outer case. A negative electrode is housed in the outer case in such a manner that the negative electrode is spaced away from the positive electrode, for example, with a separator being interposed between them. The negative electrode includes the aforementioned active material comprising the mixed phase comprising the lithium titanium composite oxide phase and the nonstoichiometric titanium oxide phase. A non-aqueous electrolyte is accommodated in the outer case.

Details of the outer case, the negative electrode, the non-aqueous electrolyte, the positive electrode and the separator will be discussed as follows.

1) Outer Case

The outer case is formed of a laminate film having a thickness of not more than 0.5 mm or formed of a metallic vessel having a thickness of not more than 1.0 mm. More preferably, the thickness of the metallic vessel should be confined to 0.5 mm or less.

The configuration of the outer case may be a flatting type, a square type, a cylindrical type, a coin type or a button type. This outer case may be variously designed depending on the size thereof. For example, it can be designed as an outer case for a small battery which can be mounted, for example, on mobile electronic instruments, or as an outer case for a large battery which can be mounted, for example, on a two-wheeled vehicle or a four-wheeled vehicle.

The laminate film can be employed a multi-layer film having a metal layer interposed between resin layers. The metal layer should preferably be formed of aluminum foil or aluminum alloy foil for reducing the weight thereof. Examples of resin layer are polypropylene (PP), polyethylene (PE), nylon, polyethylene terephthalate (PET). The laminate film can be molded into any desired configuration of outer case through sealing using thermal fuse-bonding.

The metal vessel is made of aluminum or aluminum alloys. The aluminum alloys preferably contain magnesium, zinc, or silicon. If aluminum alloys containing a transition metal such as iron, copper, nickel, or chromium, are to be employed, the amount of the transition metal should preferably be confined to not more than 100 ppm.

2) Negative Electrode

The negative electrode comprises a current collector, and a negative electrode layer which is carried on one or both surfaces of the current collector and contains an active material, a conductive agent and a binder.

The active material of the negative electrode comprises powder of a mixed phase comprising a lithium titanium composite oxide phase and a nonstoichiometric titanium oxide phase. Since this active material is featured in that the nonstoichiometric titanium oxide phase functioning as a conductive agent and the lithium titanium composite oxide phase are integrally bonded to each other, it is possible to effectively supplement the low electric conductivity of the lithium titanium composite oxide phase. Namely, without substantially necessitating the addition of a conductive agent such as carbonaceous materials which become a cause for generating gas, it is possible to effectively compensate the low electric conductivity of the lithium titanium composite oxide phase. The features mentioned above cannot be obtained if powders of the lithium titanium composite oxide and the powders of nonstoichiometric titanium oxide are simply mixed together.

Further, since the mixed phase is constructed such that the lithium titanium composite oxide phase and the nonstoichiometric titanium oxide phase are intermingled within a single particle and chemically bonded to each other, the addition of a binder for bonding these phases is no longer required substantially. As a result, it is now possible to create a negative electrode which is less influenced by the binder. Namely, according to the prior art, a negative electrode is generally manufactured in such a manner that an active agent, a conductive agent and a binder are dispersed in a solvent to prepare a slurry and then this slurry is coated on the surface of current collector and dried to obtain the negative electrode. Whereas, in the case where the active material of the negative electrode according to the above embodiment is employed, since the lithium titanium composite oxide phase functioning as an active material and the nonstoichiometric titanium oxide phase functioning as a conductive agent are chemically bonded to each other, it is now possible to reduce the number of the active material/solvent interface as well as the conductive agent/solvent interface. As a result, it is possible to suppress any excessive increase in viscosity of slurry, thus making it possible to stabilize the coating of slurry onto the current collector. Therefore, it is now possible to enhance the productivity of the negative electrode and hence the enhancement of the productivity of non-aqueous electrolyte battery. These effects can never be obtained if the powders of the lithium titanium composite oxide and the powders of nonstoichiometric titanium oxide are simply mixed together.

The conductive agent is used for enhancing the electronic collecting performance and for suppressing the contact resistance of active material to the current collector. Examples of the conductive agent are carbonaceous materials such as acetylene black, carbon black, graphite; metals; alloys; conductive ceramics. Since the nonstoichiometric titanium oxide phase existing in the active material comprising the mixed phase is enabled to function as a conductive phase, it is possible to secure sufficient conductivity of the negative electrode even if the amount of the conductive agent is reduced as compared with the case where an active material containing no nonstoichiometric titanium oxide phase is employed. Furthermore, even if carbonaceous materials are employed as a conductive agent, the quantity required of the conductive agent can be reduced. Therefore, it is possible to prominently minimize the undesirable influence that may be brought about by the generation of gas.

The binder is employed for bonding the active material to a conductive agent. Examples of the binder include polytetrafluoroethylene (PTFE), poly(vinylidene fluoride), fluorinated rubber, styrene butadiene rubber.

The mixing ratio among the active material, the conductive agent and the binder is preferably defined to not less than 80% by weight and not more than 96 t % by weight of the active material, not less than 2% by weight and not more than 10% by weight of the conductive agent, and not less than 2% by weight and not more than 10% by weight of the binder. If the mixing ratio of the conductive agent is less than 2% by weight, the electron-collecting performance of the negative electrode would be reduced, thus possibly deteriorating the large current characteristics of the non-aqueous electrolyte secondary battery. If the mixing ratio of the binder is less than 2% by weight, the bonding strength between the negative electrode layer and the current collector of the negative electrode would be decreased, thereby possibly deteriorating the cycle characteristics of battery. On the other hand, if the mixing ratio of the conductive agent and the binder exceed 10% by weight, respectively, the enhancement of capacity of battery may not be achieved.

In the manufacture of the negative electrode, the active material, the conductive agent and the binder are suspended in a common solvent to prepare a slurry. Then, the slurry is coated on the surface of a current collector of the negative electrode and dried to form a negative electrode layer, which is then pressed to manufacture the negative electrode. Alternatively, a mixture consisting of the active material, the conductive agent and the binder may be formed into pellets for using them to form the negative electrode layer.

3) Non-Aqueous Electrolyte

Examples of the non-aqueous electrolyte include a liquid non-aqueous electrolyte which can be prepared by dissolving an electrolyte in an organic solvent, and a gel-like non-aqueous electrolyte which can be obtained by making a liquid electrolyte and a macromolecular material into a composite configuration.

The liquid non-aqueous electrolyte can be prepared by dissolving an electrolyte in an organic solvent at a concentration of not less than 0.5 mol/L and not more than 2.5 mol/L.

Examples of the electrolyte include lithium salts such as lithium perchlorate ($LiClO_4$), lithium phosphate hexafluoride ($LiPF_6$), lithium borate tetrafluoride ($LiBF_4$), lithium arsenate hexafluoride ($LiAsF_6$), lithium trifluorometasulfonate ($LiCF_3SO_3$), bistrifluoromethyl sulfonyliminolithium [$LiN(CF_3SO_2)_2$], and a mixture thereof. It is preferable to employ those which can be hardly oxidized even at high electric potentials. Among them, $LiPF_6$ is most preferable.

Examples of the organic solvent include cyclic carbonates such as propylene carbonate (PC), ethylene carbonate (EC) and vinylene carbonate; linear carbonates such as diethylene carbonate (DEC), dimethylene carbonate (DMC) and methylethyl carbonate (MEC); cyclic ethers such as tetrahydrofuran (THF), 2methyl tetrahydrofuran (2Me THF) and dioxorane (DOX); linear ethers such as dimethoxy ethane (DME) and diethoxy ethane (DEE); and γ-butyrolactone (GBL); acetonitrile (AN); sulforane (SL). These solvents can be employed singly or in combination of two or more kinds.

Examples of the macromolecular materials are poly(vinylidene fluoride)(PVdF), polyacrylonitrile (PAN), polyethylene oxide (PEO).

Preferably, the organic solvent should be formed of a mixed solvent containing two or more kinds of solvents selected from the group consisting of propylene carbonate (PC), ethylene carbonate (EC) and γ-butyrolactone (GBL). More preferable organic solvent is γ-butyrolactone (GBL). The reason for this will be explained below.

The lithium titanium composite oxide phase in the mixed phase to be employed as an active material of the negative electrode is capable of absorbing and desorbing lithium ions at a potential zone close to 1.5V (vs. $Li/Li^+$). However, it is difficult to enable the non-aqueous electrolyte to undertake the reductive decomposition thereof at this potential zone and hence it may become difficult to enable a film consisting of the reduction product of non-aqueous electrolyte to be formed on the surface of the lithium titanium composite oxide phase. Because of this, if the lithium titanium composite oxide phase is stored in a lithium-absorbed state, i.e., in a charged state, the lithium ions that have been absorbed in the lithium titanium composite oxide phase are permitted to gradually diffuse into the electrolyte, thus generating self-discharging. This self-discharging becomes more prominent as the storage environment of the battery becomes hotter.

Among the aforementioned organic solvents, the γ-butyrolactone is more vulnerable to reduction as compared with linear carbonates or cyclic carbonates. More specifically, the order of vulnerability to reduction is: γ-butyrolactone>>>ethylene carbonate>propylene carbonate>>dimethyl carbonate>methylethyl carbonate>diethyl carbonate. Therefore, when this γ-butyrolactone is incorporated into an electrolyte, it becomes possible to form an excellent film on the surface of the lithium titanium composite oxide phase even at the working potential zone of the lithium titanium composite oxide phase in the mixed phase to be employed as an active material of the negative electrode. As a result, it is possible to suppress the self-discharging and to enhance the high-temperature storage characteristics of the non-aqueous electrolyte battery.

Even in the case of the aforementioned mixed solvent comprising two or more kinds of solvents selected from the group consisting of propylene carbonate (PC), ethylene carbonate (EC) and γ-butyrolactone (GBL) or especially in the case of a mixed solvent containing γ-butyrolactone, it is possible to suppress the self-discharging likewise and to enhance the high-temperature storage characteristics of the non-aqueous electrolyte battery.

For the purpose of forming an excellent protective film, the mixing ratio of the γ-butyrolactone is preferably defined to not less than 40% by volume and not more than 95% by volume based on the total amount of organic solvent.

4) Positive Electrode

The positive electrode is constituted by a current collector, and a positive electrode layer which is carried on one or both surfaces of the current collector and contains an active material, a conductive agent and a binder.

The current collector of the positive electrode should preferably be formed of, for example, aluminum foil or aluminum alloy foil containing an element such as Mg, Ti, Zn, Mn, Fe, Cu, Si.

Examples of the active material are oxides, polymers.

The oxides can be used, for example, oxides having lithium absorbed therein such as manganese dioxide ($MnO_2$), iron oxide, copper oxide and nickel oxide as well as lithium manganese composite oxides (for example, $Li_xMn_2O_4$ or $Li_xMnO_2$), lithium nickel composite oxides (for example, $Li_xNiO_2$), lithium cobalt composite oxides (for example, $Li_xCoO_2$), lithium nickel cobalt composite oxides (for example, $LiNi_{1-y}Co_yO_2$), lithium manganese cobalt composite oxides (for example, $Li_xMn_yCo_{1-y}O_2$), spinel type lithium manganese nickel composite oxides (for example, $Li_xMn_{2-y}Ni_yO_4$), lithium phosphorus oxide of olivine structure (for example, $Li_xFePO_4$, $Li_xFe_{1-y}Mn_yPO_4$, $Li_xCoPO_4$), iron sulfate ($Fe_2(SO_4)_3$), vanadium oxide (for example, $V_2O_5$). Herein x and y are preferably confined to the range of 0-1.

The polymers can be use, for example, conductive polymers such as polyaniline and polypyrrole; or disulfide-based polymer. It is also possible to sulfur (S), carbon fluoride, etc.

Among the aforementioned active materials, it is more preferable to employ those exhibiting a higher positive electrode voltage such as lithium manganese composite oxides ($Li_xMn_2O_4$), lithium nickel composite oxides ($Li_xNiO_2$), lithium cobalt composite oxides ($Li_xCoO_2$), lithium nickel cobalt composite oxides ($LiNi_{1-y}Co_yO_2$), spinel type lithium manganese nickel composite oxides ($Li_xMn_{2-y}Ni_yO_4$), lithium manganese cobalt composite oxides ($Li_xMn_yCo_{1-y}O_2$), lithium iron phosphate ($Li_xFePO_4$). Herein x and y are preferably confined to the range of 0-1.

Most preferable examples of the active material of the positive electrode are lithium cobalt composite oxides and lithium manganese composite oxides. These composite oxides are characterized by high ionic conductivity, so that when they are used in combination with the active materials of the negative electrode described above as specific embodiments, the diffusion of lithium ions in the active material of the positive electrode can be hardly brought into a rate-determining step. For this reason, these composite oxides are excellent in compatibility with the lithium titanium composite oxide phase in the mixed phase employed as the active material in the embodiments.

Preferably, the primary particle diameter of the active material of the positive electrode should be confined to not less than 100 nm and not more than 1 μm. By doing so, the handling of the active material of the positive electrode would become easier in the industrial production and, at the same time, the inter-solid diffusion of lithium ions can be made to proceed smoothly.

Preferably, the specific surface area of the active material of the positive electrode should be confined to not less than 0.1 m$^2$/g and not more than 10 m$^2$/g. By doing so, it becomes possible to sufficiently secure the absorption/desorption site of lithium ions and the handling thereof would become easier in the industrial production, and, at the same time, it is possible to secure excellent charge/discharge cycle performance of battery.

Examples of the conductive agent are carbonaceous materials such as acetylene black, carbon black, or graphite. The conductive agents described above are useful in enhancing the electronic collecting performance and for suppressing the contact resistance of active material to the current collector.

Examples of the binder are polytetrafluoroethylene (PTFE), poly(vinylidene fluoride), fluorinated rubber.

The mixing ratio among the active material, the conductive agent and the binder is preferably defined to not less than 80% by weight and not more than 95% by weight of the active material, not less than 3% by weight and not more than 10% by weight of the conductive agent, and not less than 2% by weight and not more than 10% by weight of the binder. When the mixing ratio of the conductive agent is not less than 3% by weight, it is possible to enable the conductive agent to exhibit the aforementioned effects. When the mixing ratio of the conductive agent is confined to not more than 10% by weight, it is possible to minimize the decomposition of non-aqueous electrolyte on the surface of conductive agent even in the storage under high temperatures. When the binder is incorporated at a mixing ratio of not less than 2% by weight, it is possible to secure a sufficient strength of the electrode. When the mixing ratio of binder is confined to not more than 10% by weight, it is possible to decrease the mixing ratio of the insulating material of the electrode and to decrease the internal resistance of the electrode.

In the manufacture of the positive electrode, the active material of the positive electrode, the conductive agent and the binder are suspended in a suitable solvent to prepare a slurry. Then, the slurry is coated on the surface of a current collector and dried to form a positive electrode layer, which is then pressed to manufacture the positive electrode. Alternatively, a mixture consisting of the active material of the positive electrode, the conductive agent and the binder may be formed into pellets for using them to form the positive electrode layer.

5) Separator

Examples of the separator are a porous film formed of polyethylene, polypropylene, cellulose or polyvinylidene fluoride (PVdF); and unwoven fabrics formed of synthetic resin. Among them, a porous film formed of polyethylene or polypropylene is preferable, since it is capable of being fused at a predetermined temperature, thereby cutting of electric current. Thus, this porous film is preferable in viewpoints of enhancing the safety.

Next, the non-aqueous electrolyte battery (a flattened non-aqueous electrolyte battery where the outer case is formed of a laminate film) according to one embodiment will be explained with reference to FIGS. 1 and 2.

Figure 1:
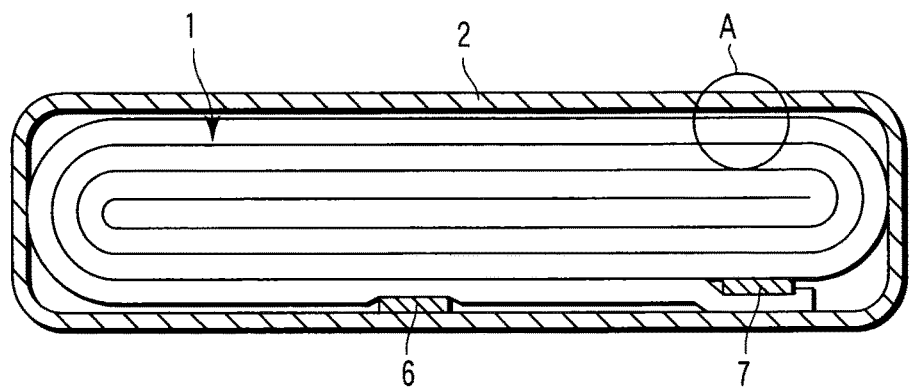
FIG. 1 is a cross-sectional view illustrating a flatting type non-aqueous electrolyte battery according to one embodiment.
Figure 2:
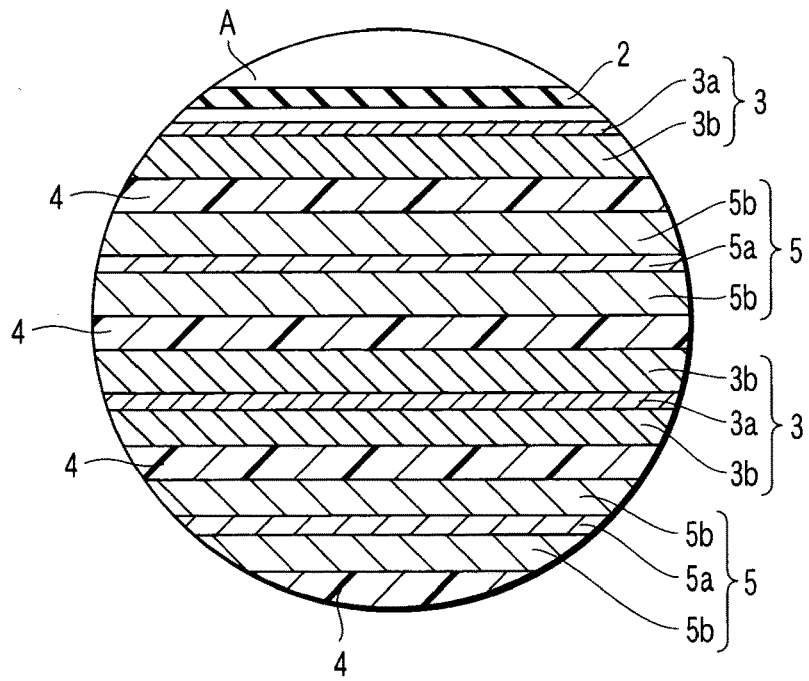
FIG. 2 is an enlarged cross-sectional view of "A" region of FIG. 1.

FIG. 1 is a cross-sectional view illustrating a flatting type non-aqueous electrolyte battery and FIG. 2 is an enlarged cross-sectional view of "A" region of FIG. 1. By the way, these figures are schematically illustrated for the purpose of explanation and for facilitating the understanding of the present invention, so that the configuration, dimension and dimensional ratio thereof may differ from those of the actual device. These features and design can be optionally modified by referring to the known technologies.

A flattened wound electrode group 1 is housed in a bag-like outer case 2 which is formed from a laminate film comprising a couple of resin layers with aluminum foil interposed between them. The flattened wound electrode group 1 is constructed by spirally wounding and press-molding a laminate comprising mentioning from outside, a negative electrode 3, a separator 4, a positive electrode 5 and a separator 4. As shown in FIG. 2, the negative electrode 3 constituting the outermost husk is constructed such that a negative electrode layer 3b containing an active material which comprises a mixed phase comprising a lithium titanium composite oxide phase and a nonstoichiometric titanium oxide phase is on an inner surface of a current collector 3a. The negative electrode 3 located inside is constructed such that the aforementioned negative electrode layer 3b is deposited on the opposite surfaces of the current collector 3a. The positive electrode 5 is constructed such that a positive electrode layer 5b is deposited on the opposite surfaces of a current collector 5a.

In the vicinity of the outer circumferential edge portion of the flattened wound electrode group 1, a negative electrode terminal 6 is electrically connected with the current collector 3a of the negative electrode 3 constituting the outermost husk and a positive electrode terminal 7 is electrically connected with the collector 5a of the inner positive electrode 5. The negative electrode terminal 6 and positive electrode terminal 7 are led out through an opening of the bag-like outer case 2. For example, a liquid non-aqueous electrolyte is poured into the bag-like outer case 2 through the opening of the outer case 2. The opening of the bag-like outer case 2 is heat-sealed with the negative electrode terminal 6 and positive electrode terminal 7 being located inside, thereby completely sealing the flattened wound electrode group 1 and the liquid non-aqueous electrolyte.

The material for the negative terminal can be employed electrically conductive materials which are excellent in electric stability under the condition where the electric potential thereof to lithium metal is confined to not less than 1.0V and not more than 3.0V. Examples of the material for the negative terminal include aluminum and aluminum alloys containing any of elements such as Mg, Ti, Zn, Mn, Fe, Cu, Si. Preferably, the negative terminal should be formed of the same material as that of the current collector of the negative electrode in order to minimize the contact resistance thereof to the current collector of the negative electrode.

The material for the positive terminal can be employed electrically conductive materials which are excellent in electric stability under the condition where the electric potential thereof to lithium ions or metal is confined to not less than 3.0V and not more than 4.25V. Examples of the material for the positive terminal include aluminum and aluminum alloys containing any of elements such as Mg, Ti, Zn, Mn, Fe, Cu, Si. Preferably, the positive terminal should be formed of the same material as that of the current collector of the positive electrode in order to minimize the contact resistance thereof to the current collector of the positive electrode.

The non-aqueous electrolyte battery according to the aforementioned embodiment is excellent in large current characteristics and enabled to exhibit gas-suppressing effects since it is equipped with a negative electrode containing an active material which comprises a mixed phase comprising the lithium titanium composite oxide phase and the nonstoichiometric titanium oxide phase.

The battery pack according to one embodiment is provided with a plurality of the aforementioned non-aqueous electrolyte batteries (single cells) which are electrically connected with each other in series, in parallel, or in series and parallel.

One example of such a battery pack will be explained in detail with reference to FIGS. 5 and 6. The single cell ca be employed the flatting type battery as shown in FIG. 1.

A plurality of single cells 21, each formed of the flatting type non-aqueous electrolyte battery shown in FIG. 1, are laminated in such a manner that the negative electrode terminal 6 and the positive electrode terminal 7, both being externally led out, are arrayed to extend in the same direction and that they are clamped together by means of an adhesive tape 22, thereby creating a combined battery 23. These single cells 21 are electrically connected with each other in series as shown in FIG. 6.

A printed wiring board 24 is disposed to face the side wall of each of the single cells 21 where the negative electrode terminal 6 and the positive electrode terminal 7 are externally led out. On this printed wiring board 24 are mounted a thermistor 25, a protection circuit 26, and a terminal 27 for electrically connecting the printed wiring board 24 with external instruments. It should be noted that in order to prevent unwanted electric connection with the wirings of the combined battery 23, an insulating plate (not shown) is attached to the surface of the printed wiring board 24 that faces the combined battery 23.

A lead 28 for the positive electrode is electrically connected, through one end thereof, with the positive electrode terminal 7 which is located at the lowest layer of the combined battery 23. The other end of the lead 28 is inserted into and electrically connected with a connector 29 for the positive terminal of the printed wiring board 24. A lead 30 for the negative electrode is electrically connected, through one end thereof, with the negative electrode terminal 6 which is located at the highest layer of the combined battery 23. The other end of the lead 30 is inserted into and electrically connected with a connector 31 for the negative terminal of the printed wiring board 24. These connectors 29 and 31 are electrically connected, through the interconnects 32 and 33 formed on the printed wiring board 24, with the protection circuit 26.

The thermistor 25 is used for detecting the temperature of single cells 21 and the signals thus detected are transmitted to the protection circuit 26. This protection circuit 26 is designed to cut off, under prescribed conditions, the wiring 34a of plus-side and the wiring 34b of minus-side which are interposed between the protection circuit 26 and the terminal 27 for electrically connecting the printed wiring board 24 with external instruments. The expression of "under prescribed conditions" herein means the conditions where the temperature detected by the thermistor 25 becomes higher than a predetermined temperature for example. Further, the expression of "under prescribed conditions" herein also means the conditions where the over-charging, over-discharging and over-current of the single cells 21 are detected. The detection of this over-charging is performed against the single cells 21 individually or entirely. In the case where the single cells 21 are to be detected individually, either the voltage of cell may be detected or the potential of the positive electrode or negative electrode may be detected. In the latter case, a lithium electrode is inserted, as a reference electrode, into individual cells 21. In the case of the battery pack shown in FIGS. 5 and 6, a wiring 35 is connected with each of the single cells 21 for detecting the voltage thereof and the signals detected are transmitted, through this wiring 35, to the protection circuit 26.

On all of the sidewalls of the combined battery 23 excepting one sidewall where the negative electrode terminal 6 and the positive electrode terminal 7 are protruded, a protective sheet 36 made of rubber or synthetic resin is disposed, respectively.

The combined battery 23 is housed, together with each of protective sheet 36 and the printed wiring board 24, in a case 37. Namely, the protective sheet 36 is disposed on the opposite inner sidewalls constituting the longer sides of the case 37 and on one inner sidewall constituting one shorter side of the case 37. On the other sidewall constituting the other shorter side of the case 37 is disposed the printed wiring board 24. The combined battery 23 is positioned in a space which is surrounded by the protective sheet 36 and the printed wiring board 24. A cap 38 is attached to the top of the case 37.

By the way, a thermally shrinkable tube may be used in place of the adhesive tape 22 for fixing the combined battery 23. In this case, the protective sheet is disposed on the opposite sidewalls of combined battery 23 and then the thermally shrinkable tube is disposed to surround these protective sheets, after which the thermally shrinkable tube is allowed to thermally shrink, thereby fastening the combined battery 23.

Figure 5:
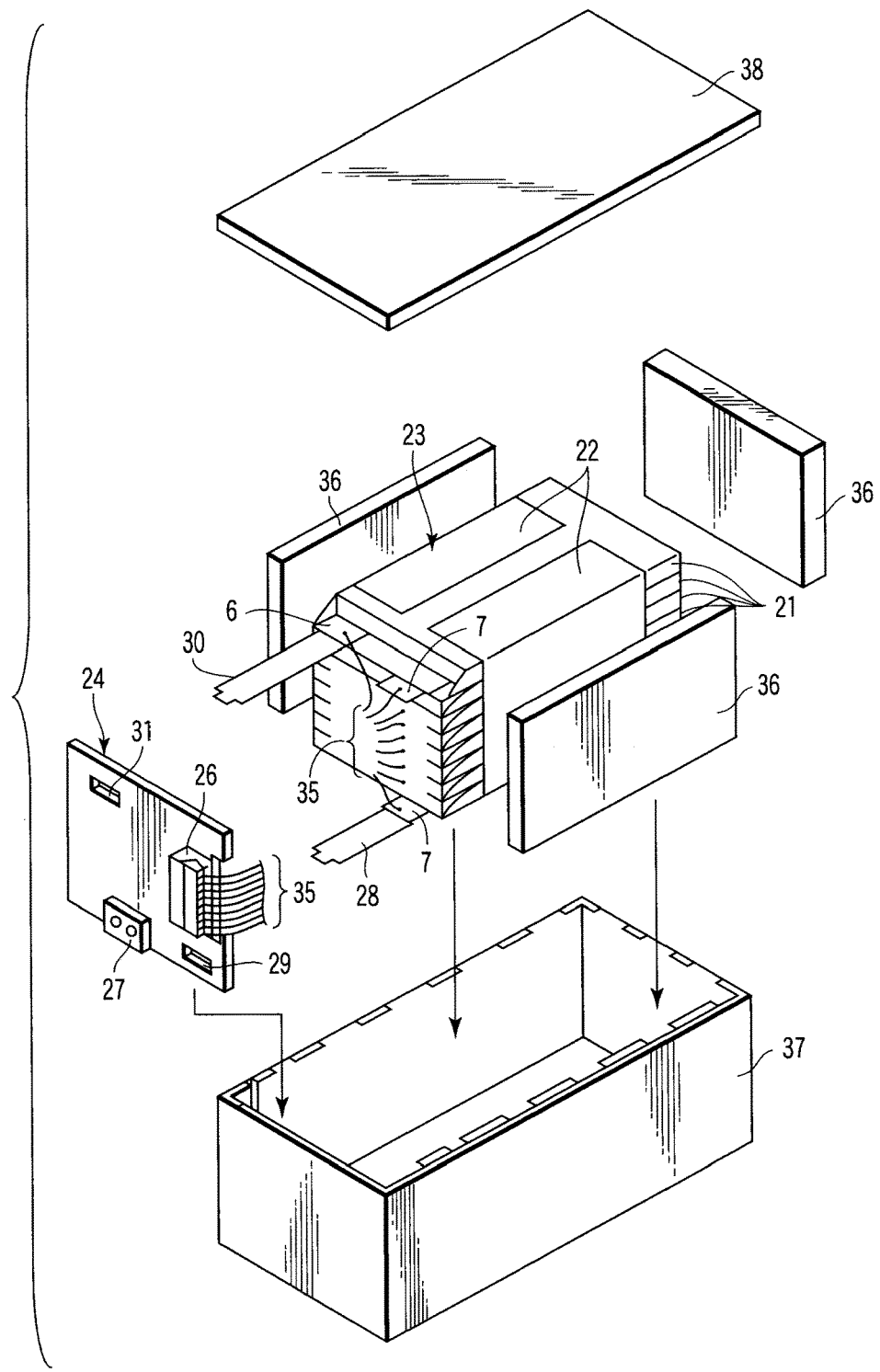
FIG. 5 is an exploded perspective view showing a battery pack according to one embodiment.
Figure 6:
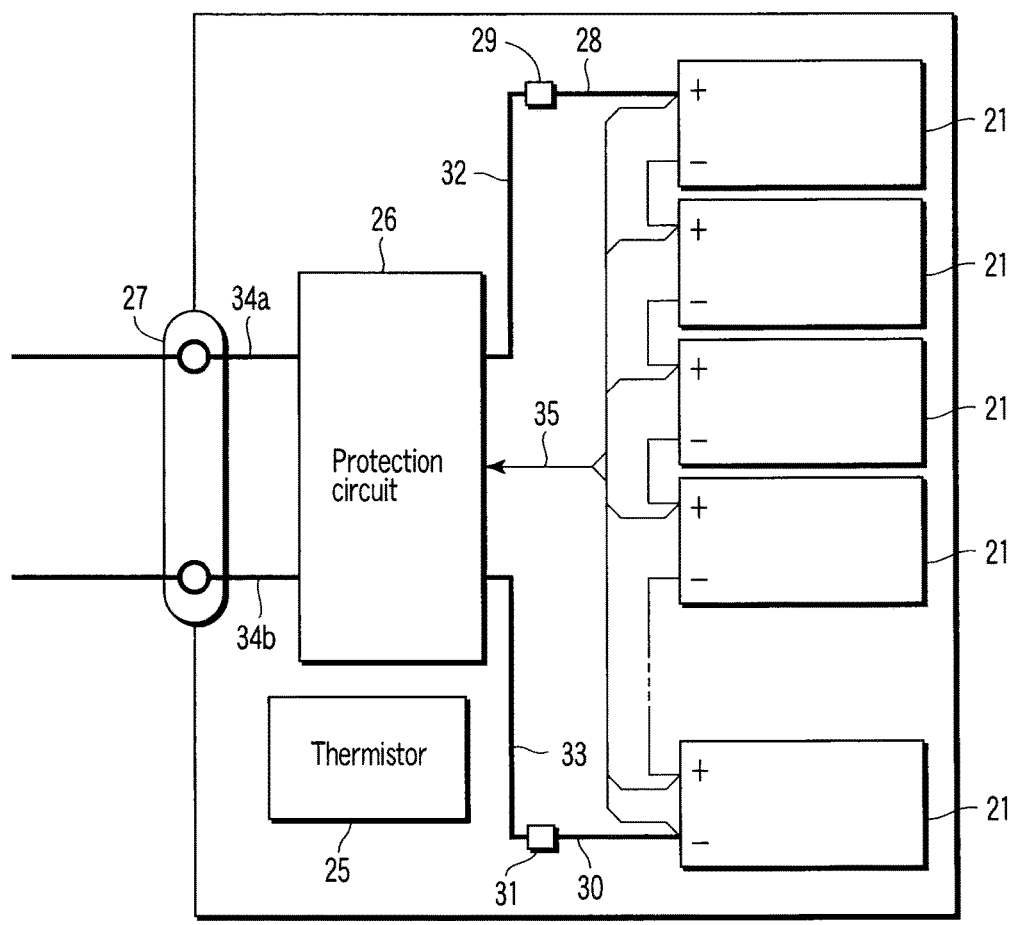
FIG. 6 is a block diagram of the battery pack shown in FIG. 5.

In the embodiment shown in FIGS. 5 and 6, the single cells 21 are electrically connected with each other in series. However, the single cells 21 may be electrically connected with each other in parallel in order to increase the capacity of battery. A plurality of battery packs, each assembled as described above, may be electrically connected with each other in series or in parallel.

Further, specific features of the battery pack may be optionally modified depending on the end-use thereof. As for the end-use of the battery pack, it can be preferably applied to those where excellent cycle characteristics are desired in large current performance. More specifically, the battery pack can be employed as a power source for digital cameras or as an on-vehicle type power source for two-wheeled or four-wheeled hybrid electric vehicles, for two-wheeled or four-wheeled electric vehicles, or for electrically assisted bicycles. Especially, the battery pack is most suited for use as an on-vehicle type power source.

As described above, by making use of the non-aqueous electrolyte containing a mixed solvent comprising two or more kinds of materials selected from the group consisting of propylene carbonate (PC), ethylene carbonate (EC) and γ-butyrolactone (GBL), or containing γ-butyrolactone (GBL), it is possible to obtain a non-aqueous electrolyte battery which is excellent in high-temperature characteristics. A battery pack provided with a combined battery consisting of a plurality of non-aqueous electrolyte batteries each constructed as described above is especially suited for use as an on-vehicle type power source.

Next, specific examples of the present invention will be explained. However, it should be noted that following examples are not intended to limit the scope of the present invention unless the gist of the present invention is exceeded.

Example 1

Manufacture of Active Material of Negative Electrode

A predetermined quantity of lithium hydroxide was dissolved as a Li source in pure water to obtain a solution. To this solution was added titanium oxide at such a mixing ratio that the atomic ratio between lithium and titanium became $4/5:(1+\alpha)$ [$\alpha=0.1$], i.e., $4/5:1.1$ and then the resultant mixed solution was stirred and dried to obtain powdery body. This powdery body was then subjected to primary sintering in air atmosphere at a temperature of 850° C. for 12 hours. After this primary sintering, the resultant powder was subjected to secondary sintering in hydrogen gas atmosphere at a temperature of 850° C. for one hour to manufacture a powdery active material of the negative electrode.

The powdery active material of the negative electrode thus obtained was then subjected to XRD analysis. As a result, it was possible to confirm the existence of not only a spinel type lithium titanium composite oxide phase but also a nonstoichiometric titanium oxide phase (TiO) of hexagonal structure.

Further, the powdery active material of the negative electrode was observed by mean of cross-sectional TEM. As a result, it was possible to confirm the existence of a mixed phase having a primary particle diameter of about 0.8 μm and comprising, as a mother phase, a lithium titanium composite oxide phase, and a nonstoichiometric titanium oxide phase which was dispersed in the mother phase.

<Manufacture of Negative Electrode>

95% by weight of a powdery active material of the negative electrode thus obtained and consisting of a mixed phase comprising the spinel type lithium titanium composite oxide phase, and the nonstoichiometric titanium oxide phase, 2% by weight of coke employed as a conductive agent, sintered at a temperature of 1200° C., exhibiting $d_{002}=0.3465$ and having an average particle diameter of 3 μm, and 3% by weight of poly(vinylidene fluoride) (PVdF) were added to and mixed with N-methylpyrrolidone (NMP) to prepare a slurry. This slurry was then coated on the opposite surfaces of a current collector made of aluminum foil having a thickness of 15 μm and then dried and pressed to manufacture a negative electrode having a density of 2.4 g/cm³.

<Manufacture of Positive Electrode>

First of all, 90% by weight of lithium cobalt oxide (LiCoO$_2$) powder, 5% by weight of acetylene black employed as a conductive agent, and 5 wt % of poly(vinylidene fluoride) (PVdF) employed as a binder were added to and mixed with N-methylpyrrolidone (NMP) to prepare a slurry. This slurry was then coated on the opposite surfaces of a current collector made of aluminum foil having a thickness of 15 μm and then dried and pressed to manufacture a positive electrode having a density of 3.3 g/cm³.

<Manufacture of Electrode Group>

The above-described positive electrode, a sheet of separator made of a porous polyethylene film having a thickness of 25 μm, the above-described negative electrode, and another sheet of separator made of the same kind of film as described above are laminated in the mentioned order and then spirally wound to form a wound body, which was thermally press at a temperature of 90° C. to manufacture a flattened wound electrode group having a width of 30 mm and a thickness of 3.0 mm.

<Preparing of Liquid Non-Aqueous Electrolyte>

LiBF$_4$ was dissolved as an electrolyte in a mixed solvent of ethylene carbonate (EC) and γ-butyrolactone (GBL) (volume ratio between EC and GBL is 1:2) at a ratio of 1.5 mol/L to prepare a liquid non-aqueous electrolyte.

<Assembling of Battery>

A bag-like outer case made from a laminate film consisting of a polyethylene terephthalate film (10 μm)/a nylon film (15 μm)/an aluminum foil (40 μm)/polyethylene film (30 μm) and having a thickness of 0.95 mm was prepared. Then, the above-described electrode group was housed in this bag-like outer case through an opening formed in this bag-like outer case and then subjected to vacuum-drying for 24 hours at a temperature of 80° C. Then, the above-described liquid non-aqueous electrolyte was into the bag-like outer case and the opening of the bag-like outer case was heat-sealed to completely close the bag-like outer case, thereby assembling a non-aqueous electrolyte battery having the same structure as shown in FIG. 1 wherein the width thereof was 35 mm, the thickness thereof 3.2 mm and the height thereof 65 mm.

Examples 2-6

Five kinds of active materials of the negative electrode were manufactured by repeating the same procedures as described in Example 1 excepting that the α of the atomic ratio $[4/5:(1+\alpha)]$ between lithium and titanium was variously changed on the occasion of mixing lithium hydroxide with titanium oxide in the manufacture of the powdery active material of the negative electrode which consisted of a mixed phase comprising the spinel type lithium titanium composite oxide and the nonstoichiometric titanium oxide phase. Five kinds of the non-aqueous electrolyte batteries, each constructed as that of Example 1, were assembled by following the same method as described in Example 1 excepting that these active materials of the negative electrode were employed in the manufacture of the negative electrode.

Comparative Example 1

Manufacture of Active Material of Negative Electrode

A predetermined amount of lithium hydroxide was dissolved as a Li source in pure water to obtain a solution. To this solution was added titanium oxide at such a mixing ratio that the atomic ratio between lithium and titanium became $4/5:(1+\alpha)$ [$\alpha=0$], i.e., $4/5:1.0$ and then the resultant mixed solution was stirred and dried to obtain powdery body. This powdery body was then subjected to sintering in air atmosphere at a temperature of 850° C. for 12 hours, thereby manufacturing a powdery active material of the negative electrode.

The powdery active material of the negative electrode thus obtained was then subjected to XRD analysis. As a result, it was confirmed that the active material was formed of a spinel type lithium titanium composite oxide without containing a nonstoichiometric titanium oxide phase. A non-aqueous electrolyte battery which was similar in configuration to that of Example 1 was assembled by following the same method as described in Example 1 excepting that this active material of the negative electrode was employed in the manufacture of the negative electrode.

Comparative Example 2

85% by weight of the active material of the negative electrode obtained in Comparative Example 1 and composed of lithium titanium composite oxide, 10% by weight of nonstoichiometric titanium oxide employed as a conductive agent (titanium black (Type No. 13M); Mitsubishi Materials Co., Ltd.), and 5% by weight of poly(vinylidene fluoride) (PVdF) employed as a binder were added to and mixed with N-methylpyrrolidone (NMP) to prepare a slurry. This slurry was then coated on the opposite surfaces of a current collector made of aluminum foil having a thickness of 15 μm and then dried and pressed to manufacture a negative electrode having a density of 2.4 g/cm$^3$. A non-aqueous electrolyte battery which was similar in configuration to that of Example 1 was assembled by following the same method as described in Example 1 excepting that this negative electrode was employed.

Comparative Example 3

90% by weight of the active material of the negative electrode obtained in Comparative Example 1 and composed of lithium titanium composite oxide, 5% by weight of acetylene black employed as a conductive agent, and 5% by weight of poly(vinylidene fluoride) (PVdF) employed as a binder were added to and mixed with N-methylpyrrolidone (NMP) to prepare a slurry. This slurry was then coated on the opposite surfaces of a current collector made of aluminum foil having a thickness of 15 μm and then dried and pressed to manufacture a negative electrode having a density of 2.4 g/cm$^3$. A non-aqueous electrolyte battery which was similar in configuration to that of Example 1 was assembled by following the same method as described in Example 1 excepting that this negative electrode was employed.

The active materials of the negative electrode obtained from Example 1 and Comparative Example 1 were analyzed by means of powder X-ray diffractometry.

Figure 7:
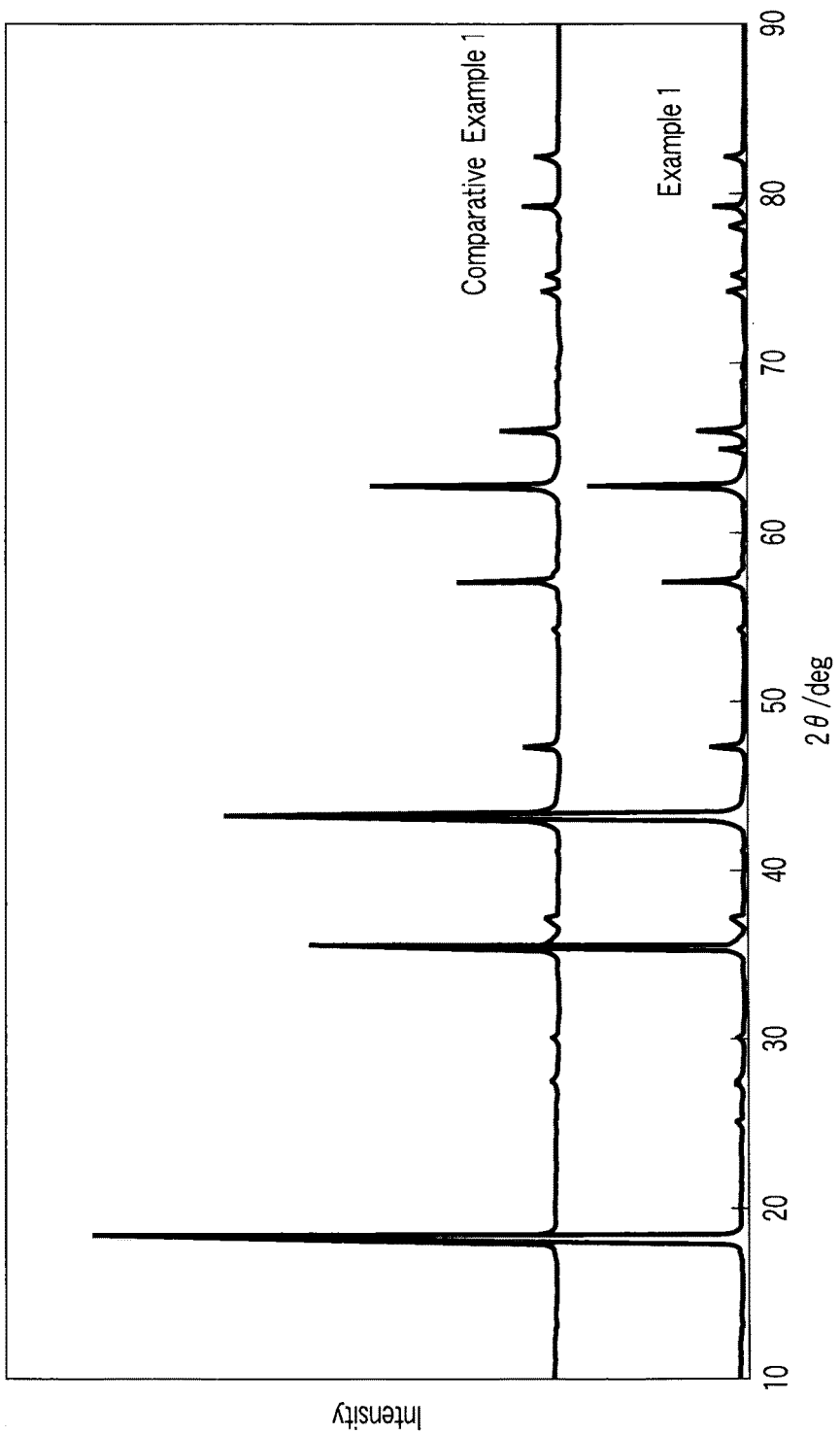
FIG. 7 is a graph showing X-ray diffraction patterns of active materials of negative electrode in Example 1 and Comparative Example 1.

First of all, by making use of an X-ray diffractometer (Type No. M18XHF[22]-SRA; Mac Science Co., Ltd.), the X-ray diffraction patterns of these active materials for the negative electrode were determined with CuKα being employed as a radiation source. FIG. 7 shows the X-ray diffraction patterns of these active materials of Example 1 and Comparative Example 1.

From the X-ray diffraction pattern of the active material of Example 1, it was possible to confirm the peak of spinel type $Li_4Ti_5O_{12}$ representing the lithium titanium composite oxide phase as well as the peak of TiO representing the nonstoichiometric titanium oxide phase. The main peak of the $Li_4Ti_5O_{12}$ was 4.83 Å (2θ:18°). Although the main peak of the TiO was 36°, since it was superimposed with that of the spinel phase, the main peak intensity thereof was calculated from the peak that could be confirmed at 65° based on the JCPDS Card (12-754). As a result, the main peak intensity of the TiO was 10 as the main peak intensity of the spinel phase was defined as 100.

On the other hand, from the X-ray diffraction pattern of the active material of Comparative Example 1, it was possible to confirm only the peak of spinel type $Li_4Ti_5O_{12}$ representing the lithium titanium composite oxide phase but it was impossible to confirm the peak of TiO representing the nonstoichiometric titanium oxide phase.

The measurements of 10 C/0.2 C capacity ratio was conducted on all of the non-aqueous electrolyte batteries obtained from Examples 1-6 and Comparative Examples 1-3. The results are shown in the following Table 1.

Further, the non-aqueous electrolyte batteries obtained from Examples 1-6 and Comparative Examples 1-3, each brought into a fully charged state, were kept in an 85° C. thermostat (Type No. EC-45MTP; Hitachi Co., Ltd.) for three days and then any changes in thickness of battery were measured. The changes (the ratio of increase) in thickness of batteries relative to the thickness of batteries before the storage thereof are shown in the following Table 1.

TABLE 1

| | Active material of negative electrode | | | Battery characteristics | | |
|---|---|---|---|---|---|---|
| | Lithium titanium composite oxide phase | Nonstoichiometric titanium oxide phase | State | XRD peak intensity ratio | 10 C/0.2 C Discharge · capacity ratio | Changes in thickness of battery (%) |
| Example 1 | $Li_4Ti_5O_{12}$ (Spinel type) | TiO | Mixed phase | 10 | 92 | +2% or less |
| Example 2 | $Li_4Ti_5O_{12}$ (Spinel type) | TiO | Mixed phase | 0.5 | 70 | +2% or less |
| Example 3 | $Li_4Ti_5O_{12}$ (Spinel type) | TiO | Mixed phase | 1 | 88 | +2% or less |
| Example 4 | $Li_4Ti_5O_{12}$ (Spinel type) | TiO | Mixed phase | 5 | 92 | +2% or less |
| Example 5 | $Li_4Ti_5O_{12}$ (Spinel type) | TiO | Mixed phase | 20 | 90 | +2% or less |
| Example 6 | $Li_4Ti_5O_{12}$ (Spinel type) | TiO | Mixed phase | 30 | 75 | +2% or less |
| Comparative Example 1 | $Li_4Ti_5O_{12}$ (Spinel type) | — | Single phase | — | 52 | +2% or less |
| Comparative Example 2 | $Li_4Ti_5O_{12}$ (Spinel type) | — | Single phase | — | 60 | +2% or less |
| Comparative Example 3 | $Li_4Ti_5O_{12}$ (Spinel type) | — | Single phase | — | 85 | +400% or more |

As apparent from Table 1, in the case of the non-aqueous electrolyte batteries obtained from Examples 1-6 wherein a mixed phase powder constituting by the lithium titanium composite oxide phase (spinel type) and the nonstoichiometric titanium oxide phase was employed as an active material of the negative electrode, the 10 C/0.2 C discharge capacity ratio thereof was found higher and excellent in large current characteristics as compared with the battery of Comparative Example 1 wherein a single phase of lithium titanium composite oxide was employed as an active material of the negative electrode or as compared with the battery of Comparative Example 2 wherein a nonstoichiometric titanium oxide powder was employed as a conductive agent.

Especially, in the cases of the non-aqueous electrolyte batteries obtained from Examples 1 and 3-5 wherein a mixed phase powder constituting by the lithium titanium composite oxide phase (spinel type) and the nonstoichiometric titanium oxide phase and enabling the ratio of main peak intensity as measured by means of XRD to fall within the range of 1-20 was employed as an active material of the negative electrode, it was found possible to further increase the 10 C/0.2 C discharge capacity ratio thereof and to further improve the large current characteristics thereof.

Further, not only the non-aqueous electrolyte batteries obtained from Examples 1-6 but also the non-aqueous electrolyte batteries obtained from Comparative Examples 1-2 indicated that it was possible to confine the changes in thickness of battery to +2% or less during the high-temperature storage thereof, thereby making it possible to maintain excellent battery performance.

Whereas, in the case of the battery of Comparative Example 3 wherein acetylene black was incorporated as a conductive agent in order to assist the large current characteristics of the active material of the negative electrode which consisted of a single phase of (spinel type) lithium titanium composite oxide phase, although it was possible to improve the large current characteristics thereof, the changes in thickness of battery were caused to increase up to +400% or more during the high-temperature storage thereof, thereby making it impossible to maintain the desirable battery performance.

Example 7

Manufacture of Active Material of Negative Electrode

A predetermined amount of lithium hydroxide was dissolved as a Li source in pure water to obtain a solution. To this solution was added titanium oxide at such a mixing ratio that the atomic ratio between lithium and titanium became $2/3:(1+\alpha)$ [$\alpha=0.1$], i.e., $2/3:1.1$ and then the resultant mixed solution was stirred and dried to obtain powdery body. This powdery body was then subjected to primary sintering in air atmosphere at a temperature of 1050° C. for 12 hours. After this primary sintering, the resultant powder was subjected to secondary sintering in hydrogen gas atmosphere at a temperature of 1000° C. for one hour to manufacture a powdery active material of the negative electrode.

The powdery active material of the negative electrode thus obtained was then subjected to XRD analysis. As a result, it was possible to confirm the existence of not only a lithium titanium composite oxide phase of ramsdellite type structure but also a nonstoichiometric titanium oxide phase (TiO) of hexagonal structure.

Further, the powdery active material of the negative electrode was observed by mean of cross-sectional TEM. As a result, it was possible to confirm the existence of a mixed phase having a primary particle diameter of about 0.8 μm and comprising, as a mother phase, a lithium titanium composite oxide phase, and a nonstoichiometric titanium oxide phase which was dispersed in the mother phase.

A non-aqueous electrolyte battery which was similar in configuration to that of Example 1 was assembled by following the same method as described in Example 1 excepting that the active material of the negative electrode obtained as described above was employed in the manufacture of the negative electrode.

Examples 8-12

Five kinds of active materials of the negative electrode were manufactured by repeating the same procedures as described in Example 7 excepting that the α of the atomic ratio [$2/3:(1+\alpha)$] between lithium and titanium was variously changed on the occasion of mixing lithium hydroxide with titanium oxide in the manufacture of the powdery active material of the negative electrode which consisted of a mixed phase comprising the ramsdellite type lithium titanium composite oxide and the nonstoichiometric titanium oxide phase. Five kinds of the non-aqueous electrolyte batteries, each constructed as that of Example 1, were assembled by following the same method as described in Example 1 excepting that these active materials of the negative electrode were employed in the manufacture of the negative electrode.

Comparative Example 4

Manufacture of Active Material of Negative Electrode

A predetermined amount of lithium hydroxide was dissolved as a Li source in pure water to obtain a solution. To this solution was added titanium oxide at such a mixing ratio that the atomic ratio between lithium and titanium became $2/3:(1+\alpha)$ [$\alpha=0$], i.e., $2/3:1.0$ and then the resultant mixed solution was stirred and dried to obtain powdery body. This powdery body was then subjected to sintering in air atmosphere at a temperature of 1050° C. for 12 hours, thereby manufacturing a powdery active material of the negative electrode.

The powdery active material of the negative electrode thus obtained was then subjected to XRD analysis. As a result, it was confirmed that the active material was formed of a ramsdellite type lithium titanium composite oxide without containing a nonstoichiometric titanium oxide phase. A non-aqueous electrolyte battery which was similar in configuration to that of Example 1 was assembled by following the same method as described in Example 1 excepting that this active material of the negative electrode was employed in the manufacture of the negative electrode.

Comparative Example 5

85% by weight of the active material of the negative electrode obtained in Comparative Example 4 and composed of lithium titanium composite oxide, 10% by weight of nonstoichiometric titanium oxide employed as a conductive agent (titanium black (Type No. 13M); Mitsubishi Materials Co., Ltd.), and 5% by weight of poly(vinylidene fluoride) (PVdF) employed as a binder were added to and mixed with N-methylpyrrolidone (NMP) to prepare a slurry. This slurry was then coated on the opposite surfaces of a current collector made of aluminum foil having a thickness of 15 μm and then dried and pressed to manufacture a negative electrode having a density of 2.4 g/cm$^3$. A non-aqueous electrolyte battery which was similar in configuration to that of Example 1 was assembled by following the same method as described in Example 1 excepting that this negative electrode was employed.

Comparative Example 6

90% by weight of the active material of the negative electrode obtained in Comparative Example 4 and composed of lithium titanium composite oxide, 5% by weight of acetylene black employed as a conductive agent for the negative electrode, and 5% by weight of poly(vinylidene fluoride) (PVdF) employed as a binder were added to and mixed with N-methylpyrrolidone (NMP) to prepare a slurry. This slurry was then coated on the opposite surfaces of a current collector made of aluminum foil having a thickness of 15 μm and then dried and pressed to manufacture a negative electrode having a density of 2.4 g/cm³. A non-aqueous electrolyte battery which was similar in configuration to that of Example 1 was assembled by following the same method as described in Example 1 excepting that this negative electrode was employed.

The measurements of 10 C/0.2 C capacity ratio was conducted on all of the non-aqueous electrolyte batteries obtained from Examples 7-12 and Comparative Examples 4-6. The results are shown in the following Table 2.

Further, the non-aqueous electrolyte batteries obtained from Examples 7-12 and Comparative Examples 4-6, each brought into a fully charged state, were kept in an 85° C. thermostat (Type No. EC-45MTP; Hitachi Co., Ltd.) for three days and then any changes in thickness of battery were measured. The changes (the ratio of increase) in thickness of batteries relative to the thickness of batteries before the storage thereof are shown in the following Table 2.

Further, not only the non-aqueous electrolyte batteries obtained from Examples 7-12 but also the non-aqueous electrolyte batteries obtained from Comparative Examples 4 and 5 indicated that it was possible to confine the changes in thickness of battery to +2% or less during the high-temperature storage thereof, thereby making it possible to maintain excellent battery performance.

Whereas, in the case of the battery of Comparative Example 6 wherein acetylene black was incorporated as a conductive agent in order to assist the large current characteristics of the active material of the negative electrode which was consisted of a single phase of (ramsdellite type) lithium titanium composite oxide phase, although it was possible to improve the large current characteristics thereof, the changes in thickness of battery were caused to increase up to +400% or more during the high-temperature storage thereof, thereby making it impossible to maintain the desirable battery performance.

Although various embodiments of the present invention have been explained, it should not be construed that the present invention is limited by these embodiments but

TABLE 2

| | Active material of negative electrode | | | Battery characteristics | |
| --- | --- | --- | --- | --- | --- |
| | Lithium titanium composite oxide phase | Nonstoichiometric titanium oxide phase | State | XRD peak intensity ratio | 10 C/0.2 C Discharge · capacity ratio | Changes in thickness of battery (%) |
| Example 7 | $Li_2Ti_3O_7$ (Ramsdellite type) | TiO | Mixed phase | 10 | 87 | +2% or less |
| Example 8 | $Li_2Ti_3O_7$ (Ramsdellite type) | TiO | Mixed phase | 0.5 | 65 | +2% or less |
| Example 9 | $Li_2Ti_3O_7$ (Ramsdellite type) | TiO | Mixed phase | 1 | 84 | +2% or less |
| Example 10 | $Li_2Ti_3O_7$ (Ramsdellite type) | TiO | Mixed phase | 5 | 87 | +2% or less |
| Example 11 | $Li_2Ti_3O_7$ (Ramsdellite type) | TiO | Mixed phase | 20 | 85 | +2% or less |
| Example 12 | $Li_2Ti_3O_7$ (Ramsdellite type) | TiO | Mixed phase | 30 | 67 | +2% or less |
| Comparative Example 4 | $Li_2Ti_3O_7$ (Ramsdellite type) | — | Single phase | — | 40 | +2% or less |
| Comparative Example 5 | $Li_2Ti_3O_7$ (Ramsdellite type) | — | Single phase | — | 50 | +2% or less |
| Comparative Example 6 | $Li_2Ti_3O_7$ (Ramsdellite type) | — | Single phase | — | 78 | +400% or more |

As apparent from Table 2, in the case of the non-aqueous electrolyte batteries obtained from Examples 2-7 wherein a mixed phase powder constituting by the lithium titanium composite oxide phase (ramsdellite type) and the nonstoichiometric titanium oxide phase was employed as an active material of the negative electrode, the 10 C/0.2 C discharge capacity ratio thereof was found higher and excellent in large current characteristics as compared with the battery of Comparative Example 4 wherein a single phase of lithium titanium composite oxide was employed as an active material of the negative electrode or as compared with the battery of Comparative Example 5 wherein a nonstoichiometric titanium oxide powder was employed as a conductive agent.

Especially, in the cases of the non-aqueous electrolyte batteries obtained from Examples 7 and 9-11 wherein a mixed phase powder constituting by the lithium titanium composite oxide phase (ramsdellite type) and the nonstoichiometric titanium oxide phase and enabling the ratio of main peak intensity as measured by means of XRD to fall within the range of 1-20 was employed as an active material of the negative electrode, it was found possible to further increase the 10 C/0.2 C discharge capacity ratio thereof and to further improve the large current characteristics thereof.

should be understood that the present invention can be variously modified without departing from the scope of the general inventive concept as defined by the appended claims. Further, in the practice of the present invention also, the present invention can be variously modified without departing from the gist of the present invention. Moreover, a plurality of constituent elements disclosed in these embodiments may be optionally combined to create various forms of invention.

What is claimed is:

1. An active material for a battery, comprising a mixed phase comprising a lithium titanium composite oxide phase and a nonstoichiometric titanium oxide phase, wherein the lithium titanium composite oxide phase and the nonstoichiometric titanium oxide phase coexist in the mixed phase in a single particle without being spaced away from each other,
   wherein a main peak intensity of the nonstoichiometric titanium oxide phase is confined to not less than 1 and not more than 20 when a main peak intensity of the lithium titanium composite oxide phase is assumed as 100.

2. The active material according to claim 1, wherein the lithium titanium composite oxide phase has a spinel type structure or a ramsdellite type structure.

3. The active material according to claim 1, wherein the lithium titanium composite oxide phase is represented by a chemical formula of: $Li_{4+w}Ti_5O_{12}$ ($0 \leq w \leq 3$) or $Li_{2+y}Ti_3O_7$ ($0 \leq y \leq 3$).

4. The active material according to claim 1, wherein the nonstoichiometric titanium oxide phase has a Magneli structure represented by a general formula of: $Ti_nO_{2n-1}$ ($4 \leq n \leq 10$), a rhombic structure represented by a general formula of: $TiO_n$ ($1.85 < n < 2$), a monoclinic structure represented by a general formula of: $Ti_3O_5$, or a hexagonal structure represented by TiO.

5. The active material according to claim 1, wherein the lithium titanium composite oxide phase or the nonstoichiometric titanium oxide phase further comprises at least one element selected from the group consisting of Nb, Ta, P, Na and K.

6. The active material according to claim 1, wherein the active material is powdery and has an average particle diameter of not less than 0.1 μm and not more than 1 μm in the primary particle.

7. A non-aqueous electrolyte battery comprising:
an outer case;
a positive electrode housed in the outer case;
a negative electrode housed in the outer case in a manner that it is spaced away from the positive electrode, and containing an active material; and
a non-aqueous electrolyte accommodated in the outer case,
wherein the active material comprises a mixed phase comprising a lithium titanium composite oxide phase and a nonstoichiometric titanium oxide phase, the lithium titanium composite oxide phase and the nonstoichiometric titanium oxide phase coexisting in the mixed phase in a single particle without being spaced away from each other, and
a main peak intensity of the nonstoichiometric titanium oxide phase is confined to not less than 1 and not more than 20 when a main peak intensity of the lithium titanium composite oxide phase is assumed as 100.

8. The battery according to claim 7, wherein the non-aqueous electrolyte comprises a mixed solvent comprising two or more kinds of solvent selected from the group consisting of propylene carbonate, ethylene carbonate and γ-butyrolactone.

9. The battery according to claim 7, wherein the non-aqueous electrolyte comprises γ-butyrolactone as a solvent.

10. The battery according to claim 7, wherein the positive electrode contains lithium cobalt composite oxide or lithium manganese composite oxide as an active material.

11. A battery pack comprising a plurality of the non-aqueous electrolyte batteries each defined in claim 7, which are respectively electrically connected with each other in series, in parallel, or in series and parallel.

12. The battery pack according to claim 11, which further comprises a protective circuit for detecting the voltage of the non-aqueous electrolyte batteries.

13. The battery according to claim 7, wherein the negative electrode comprises an active material, a conductive agent and a binder, and the mixing ratio among the active material, the conductive agent and the binder is not less than 80% by weight and not more than 96% by weight of the active material, not less than 2% by weight and not more than 10% by weight of the conductive agent, and not less than 2% by weight and not more than 10% by weight of the binder.

14. The active material according to claim 1, wherein the main peak intensity of the nonstoichiometric titanium oxide phase is confined to not less than 5 and not more than 10 when the main peak intensity of the lithium titanium composite oxide phase is assumed as 100.

15. The battery according to claim 7, wherein the main peak intensity of the nonstoichiometric titanium oxide phase is confined to not less than 5 and not more than 10 when the main peak intensity of the lithium titanium composite oxide phase is assumed as 100.

* * * * *